(12) United States Patent
Haverlag et al.

(10) Patent No.: US 10,667,368 B2
(45) Date of Patent: May 26, 2020

(54) LIGHTING DEVICE WITH TIMING CIRCUIT SYNCHRONISATION

(71) Applicant: SIGNIFY HOLDING B.V., Eindhoven (NL)

(72) Inventors: Marco Haverlag, Eindhoven (NL); Marcel Beij, Eindhoven (NL); Ralph Antonius Cornelis Braspenning, Eindhoven (NL)

(73) Assignee: SIGNIFY HOLDING B.V., Eindhoven (SE)

( * ) Notice: Subject to any disclaimer, the term of this patent is extended or adjusted under 35 U.S.C. 154(b) by 0 days.

(21) Appl. No.: 16/478,005

(22) PCT Filed: Jan. 15, 2018

(86) PCT No.: PCT/EP2018/050845
§ 371 (c)(1),
(2) Date: Jul. 15, 2019

(87) PCT Pub. No.: WO2018/134150
PCT Pub. Date: Jul. 26, 2018

(65) Prior Publication Data
US 2019/0350071 A1   Nov. 14, 2019

(30) Foreign Application Priority Data
Jan. 17, 2017 (EP) ..................... 17151702

(51) Int. Cl.
*H05B 47/16* (2020.01)
(52) U.S. Cl.
CPC ................... *H05B 47/16* (2020.01)

(58) Field of Classification Search
CPC ........... H05B 37/0272; H05B 37/0227; H05B 37/0281; H05B 37/0218; H05B 33/0854;
(Continued)

(56) References Cited

U.S. PATENT DOCUMENTS

| 2002/0154652 A1 | 10/2002 | Yoshimura et al. |
| 2015/0364948 A1 | 12/2015 | Kaag |
| 2016/0021721 A1* | 1/2016 | Lee ................... H05B 37/0218 315/153 |

FOREIGN PATENT DOCUMENTS

| DE | 4418315 A1 | 11/1995 |
| FR | 2847760 A1 | 5/2004 |

(Continued)

*Primary Examiner* — Wei (Victor) Y Chan
(74) *Attorney, Agent, or Firm* — Akarsh P. Belagodu

(57) ABSTRACT

A timing circuit (24), in particular a real time clock circuit, in a lighting device (10) that is periodically (17) powered from a main power supply (15) in accordance with a power supply cycle having a power-on time and a power-off time, is automatically synchronized in case the power condition of an auxiliary power supply (23) is insufficient to assume correct operation of the timing circuit (24). At each power-on of the power supply cycle, a power condition of the auxiliary power supply (23) is monitored. If the determined power condition exceeds a set power threshold, it is assumed that the momentary timing value of the timing circuit (24) is correct and this value is stored in a non-volatile memory (29), If the determined power condition gives rise to assuming malfunctioning of the timing circuit (24), for example due to absence of power for a longer time, the timing circuit (24) is synchronised to the stored timing value.

15 Claims, 3 Drawing Sheets

(58) Field of Classification Search
CPC ............ H05B 33/0872; H05B 33/0803; H05B 33/0842; H05B 33/0845
See application file for complete search history.

(56) References Cited

FOREIGN PATENT DOCUMENTS

| | | |
|---|---|---|
| GB | 2427767 A | 1/2007 |
| WO | 2006126240 A1 | 11/2006 |
| WO | 2007091175 A1 | 8/2007 |
| WO | 200912816 A1 | 1/2009 |

\* cited by examiner

LIGHTING DEVICE WITH TIMING CIRCUIT SYNCHRONISATION

CROSS-REFERENCE TO PRIOR APPLICATIONS

This application is the U.S. National Phase application under 35 U.S.C. § 371 of International Application No. PCT/EP2018/050845, filed on Jan. 15, 2018, which claims the benefit of European Patent Application No. 17151702.2, filed on Jan. 17, 2017. These applications are hereby incorporated by reference herein.

TECHNICAL FIELD

The present disclosure generally relates to the field of lighting and, more particularly, to a time-controlled switched lighting device and a method arranged for automatically synchronising a timing circuit for time-controlled switching of the lighting device after a power outage.

BACKGROUND

In recent years a migration is taking place from simple stand-alone lighting devices towards lighting systems comprised of a plurality of lighting devices equipped with automatic switching and communication facilities, such as time-controlled switching and wireless communication, for example. Such systems of interconnected lighting devices or luminaires offer a wide range of control functions, but are more expensive than basic luminaires with a simple on-off function only.

In situations in which a more basic functionality is sufficient, but still an easy adaptation of the settings of the lighting operation is required, such as a time-controlled lighting operation, the lighting device may be made configurable via a local point-to-point wireless connection, such as a Bluetooth™ or Wi-Fi connection, for example. This adds less cost and still offers the possibility to change the settings of the luminaire electronically, instead of physically or manually adapting the settings with each lighting device.

If the luminaire is equipped with a timing circuit, such as a real-time clock, the device can run lighting schedules that are not only time-dependent, but may also dependent on the day of the week, for meeting different lighting demands on weekdays or weekends, for example, or may be dependent on the day of the year to include public holidays and to compensate for daylight savings in case of public outdoor lighting or safety lighting operation, for example.

Outdoor luminaires for street lighting, for example, may connect to a separately switched main power supply or grid, such as the case in many European countries, by which the lighting device is periodically powered in accordance with a power supply cycle having a power-on time and a power-off time. Accordingly, the lighting device and hence the timing circuit is not continuously powered. To keep the timing circuit running during the power-off periods, an independent backup or auxiliary power source is needed for additionally powering the timing circuit. For this purpose, a chargeable battery or a sufficiently large (super) capacitor may be used, for example, that keeps the timing circuit 'alive' in between power supply cycles.

If the backup power is supplied by a non-chargeable battery, a sufficient capacity must be available to span the entire economic lifetime of the luminaire, in order to avoid a regular, costly and labour-intensive replacement of the battery in each luminaire. This capacity must be even larger due to the fact that the battery has self-leakage that over the years can add to become a substantial portion of the overall capacity loss. Moreover tolerances in battery capacity, consumption of the clock chip and temperature cycles will increase the capacity requirement even more. Therefore a relatively large battery must be used, which adds not only to cost but also to the size of the lighting device.

One way to overcome this is to make use of a (re-)chargeable battery that gets charged whenever the lighting device is on mains power or by using a temporary power storage, such as a capacitor having a particular power storage capacity. With the typical power consumption of current timing circuits, such as real-time semiconductor chipsets and available capacitance values, it is possible to keep the timing circuit powered for spanning several days or even some weeks in-between power supply cycles which, in most practical cases, appears sufficient.

It can, however, happen in practice that the power-off period of the main power supply is longer than the power life-time of a battery or charge storage capacitor, for example in case of a serious power failure or power outage that is not repaired within this period. For these cases it is desired that some mechanism is available to synchronise the time function in each lighting device.

US patent application US2016/0021721 discloses a street lighting device having a processor controlled self-calibrating clock device and stored historical ambient light data. The street light senses ambient light conditions and matches same to the historical data for determining a current date, day and month of a year.

Sensors for measuring ambient light conditions, for example, besides adding to the component costs of a lighting device, also put requirements on the design of the housing of the lighting device, such that sufficient light can impinge on a sensor, and for avoiding accumulation of dirt and moisture by which the entrance of light could be decreased over time.

SUMMARY

It is an object of the present invention to provide for synchronisation of a timing circuit in a time-controlled switched lighting device to avoid malfunctioning of the lighting device in the event of an insufficient power supply for powering the timing circuit from an auxiliary power source of the lighting device.

In a first aspect there is provided a method of synchronizing a timing circuit, in particular a real time clock circuit, in a lighting device that is periodically powered from a main power supply in accordance with a power supply cycle having a power-on time and a power-off time. The lighting device comprising a light emitting module and a control circuit for switching the light emitting module based on the timing circuit and comprising a non-volatile memory, the timing circuit being additionally powered from a chargeable auxiliary power supply charged by the main power supply, the method comprising the steps of:
  determining, by the control circuit, at each power-on of the power supply cycle, a power condition of the auxiliary power supply,
  storing, by the control circuit, in the memory, a momentary timing value of the timing circuit if the determined power condition exceeds a set power threshold, and
  setting, by the control circuit, the timing circuit at the stored timing value if the determined power condition is below the set power threshold.

By checking the power condition of the auxiliary power supply each time at the start of a power supply cycle, it is established whether or not the correct timing operation of the timing circuit is adversely affected by a power insufficiency of the auxiliary power supply during absence of power from the main power supply or otherwise absence of power at the lighting device.

If it is established that the power condition is sufficient, it may be validly assumed that the timing status of the timing circuit can be relied on. In that case, the momentary timing value at the start of the power supply cycle is stored in the memory.

However, if it is established that the power condition of the auxiliary power supply is insufficient, there is a non-negligible risk that the actual timing value of the timing circuit at the start of the power supply cycle is affected by the insufficiency of power and cannot be relied on. In the extreme case of an empty auxiliary power source, for example, it will be clear that the timing circuit even has ceased operation. In that case, with the availability of the mains power supply, the timing circuit starts to operate and it is timing value is set at the timing value stored in the memory.

It will be appreciated that when the power supply cycle, for example, starts each day at the same time, for example at 18:00 h in the evening, by the above method, the timing circuit is automatically synchronized to the correct time of a day. However, also when the power supply cycle does not start each day at the same time but, let say, is started at sunset, the timing circuit will be approximately synchronized at the correct time of the day, provided that the period since the last storage of the timing value is not too large. That is, over a couple of days, the time of sunset will not change too drastic. During winter time, for example, daily sunset times vary just one or two minutes in a fortnight.

For putting the light device in operation for the first time, a timing value that matches the power-on time of the power supply cycle may be pre-stored in the memory, for example. Alternatively, this timing value can be forwarded to the timing circuit via a data connection, such as a wired or wireless data link, at the time of installation of the lighting device.

With the method disclosed, a timing circuit, such as a real time clock or even a counter autonomously operating on a stable frequency base, such as crystal type oscillator, can be automatically synchronized without requiring excessive processing power or complex computing algorithms or the like, and not requiring a network timing or the like, such that this solution is excellently suitable for upgrading basic lighting devices or existing lighting devices already having a clock or timing circuit.

In a further embodiment the control circuit is operative for storing, in the memory, a momentary timing value of the timing circuit at power-off of the power supply cycle, and for calculating a power supply cycle time-length from the timing value stored in the memory at power-on and the timing value stored at power-off of a corresponding power supply cycle.

From the timing values stored at the start, i.e. power-on, and stop, i.e. power-off, the power supply the time-length of the respective power supply cycle may be calculated by the control device and stored in the memory. If, for example, a current time-length significantly deviates from a stored time-length or a default time-length value stored in the memory, for example by more than an hour, it may be concluded that there is a malfunctioning in the control equipment controlling the power supply cycle, such that stored timing values may be discarded, for example. A time difference of an hour may occur in view of daylight saving time changes, for example.

It will be appreciated that for storing power-off time values, the control circuit and the memory have to remain powered until the storage and calculations are completed. The power required may be withdrawn from the auxiliary power supply, for example.

In another embodiment, wherein the lighting device is periodically powered in accordance with a plurality of sequential power supply cycles, and each power supply cycle having a different time-length and at least one of a power-on timing value and a power-off timing value is stored in the memory, the method further comprises the steps of:
  determining, by the control circuit, from the calculated power supply cycle time-length and the stored power supply cycle time-lengths, a power supply cycle matching the calculated power supply cycle time-length, and
  resetting, by the control circuit, the timing circuit at either one of the power-off timing value of the matching power supply cycle and the power-on timing value of a next power supply cycle following the matching power supply cycle at power-on of the next power supply cycle.

By providing different power supply cycle time-lengths for each day of the week, for example, and calculating a momentary power supply cycle time-length from the timing values of a particular power supply cycle stored at power-on and power-off thereof, and comparing same with the stored, known power supply cycle time-lengths, from the matching cycle time-length the day of the week can be established.

Accordingly, the timing circuit can be reset, if applicable, to the correct day of the week using either the stop or power-of timing value of the matching power cycle stored in the memory, or reset to the power-on timing value stored in the memory of a next power supply cycle following the matching power supply cycle at the start or power-on of the next power supply.

It will be appreciated that in some applications, two or more power supply cycles in a same day or period may be provided. In that case, by providing each power supply cycle a unique time-length, the timing circuit can be still synchronized to the correct day and time of a day, for example.

In an even further embodiment, by ensuring that each power supply cycle time-length corresponds to a different day of a year, the timing circuit, in the above described manner, can be reset, i.e. synchronized, to a corresponding day of the year based on a respective one of the matching power supply cycle and the next power supply cycle. In this manner, power supply cycles that differ for public holidays and during daylight savings periods may be taken into account when synchronising or calibrating the timing circuit.

The time-length of a particular power supply cycle can be coded to a particular day of a year, when the power supply time-length comprises a minutes part and a seconds part, by having the length of one of the parts indicating a particular month, for example the minutes part, and a length of another of the parts, such as the seconds part, indicating a particular day of the month. It is, for example, also possible that the minutes part refers to a particular week of the year.

The thus coded time-lengths and corresponding power-on and power-off times may be stored in the memory in the form of an operating schedule, for example.

In an embodiment, the power condition of the auxiliary power supply is determined by sensing a voltage of the auxiliary power supply and comparing the sensed voltage with a pre-set voltage threshold, wherein the power condition exceeds a set power threshold if the sensed voltage exceeds the voltage threshold and the power condition is below the power threshold if the sensed voltage is below the voltage threshold.

In a second aspect there is provided a lighting device, for being periodically powered from a main power supply in accordance with a power supply cycle having a power-on time and a power-off time. The lighting device comprising a light emitting module, a timing circuit, in particular a real time clock circuit, a control circuit for switching the light emitting module based on the timing circuit, a non-volatile memory operatively connected to the control circuit, and an auxiliary power supply, operatively connected for being charged from the main power supply and for powering the timing circuit, the control circuit being arranged for:

determining, at each power-on of the power supply cycle, a power condition of the auxiliary power supply, storing, in the memory, a momentary timing value of the timing circuit if the determined power condition exceeds a set power threshold, and setting the timing circuit at the stored timing value if the determined power condition is below the set power threshold.

The light emitting module may comprise any known type of light emitting module or light source, such as halogen type lighting, solid-state Light Emitting Diodes, LEDs, fluorescent type lighting, LED retrofit lamps and the like. The timing circuit may be arranged for time-controlled operation of the light emitting module during a power supply cycle in which the lighting device is powered, such as dimming or completely switching off the emission of light during specific time periods.

In a further embodiment of the lighting device the control circuit is arranged for storing, in the memory, a momentary timing value of the timing circuit at power-off of the power supply cycle. As disclosed above, this provides for power supply time-length calculations of a respective power supply cycle by the control device.

In an advanced embodiment of the lighting device, the memory is arranged for storing a plurality of sequential power supply cycles having different time-lengths, such that for each power supply cycle at least on of a power-on timing value and a power-off timing value of that power supply cycle and its length is stored in the memory. The control circuit being arranged for:

calculating a power supply cycle time-length from the timing value used for setting the timing circuit value and the timing value stored at power-off of a corresponding power supply cycle, determining, from the calculated power supply cycle time-length and the stored power supply cycle time-lengths, a power supply cycle matching the calculated power supply cycle time-length, and resetting the timing circuit at either one of the power-off timing value of the matching power supply cycle and the power-on timing value of a next power supply cycle following the matching power supply cycle at power-on of the next power supply cycle.

In a particular embodiment, each power supply cycle time-length stored in the memory corresponds to a different day of a week, and the control circuit is arranged for resetting the timing circuit to a corresponding day of the week based on a respective one of the matching power supply cycle and the next power supply cycle.

In a yet further advanced embodiment, each power supply cycle time-length stored corresponds to a different day of a year, and the control circuit is arranged for resetting the timing circuit to a corresponding day of the year based on a respective one of the matching power supply cycle and the next power supply cycle. The memory may be arranged for storing respective power supply cycle data in the form of a lighting operating schedule, which schedule may also comprise operations data for operating the lighting device when powered during a power supply cycle.

In an embodiment, the timing circuit is an autonomous Real Time Clock, RTC, integrated circuit and the auxiliary power supply is a super-capacitor. The auxiliary power supply may also comprise a (re)chargeable battery or batteries. For operation at very low temperatures, with values possibly well below −20 degrees C., which may occur in many parts of the world where the lighting device nay be used, (re)chargeable batteries may cause malfunctioning due to the low temperatures. In particular for this type of applications, it is proposed to use a super-capacitor instead, for which types are available that can be used down to −40 degrees C., for example.

For determining a power condition of the auxiliary power supply, the control circuit may comprise circuitry internally arranged or integrated with the control circuit, or dedicated external circuitry connected to and controlled by the control circuit, for example.

In an embodiment of the lighting device according to the present disclosure, the control circuit comprises a voltage sensing circuit for sensing a voltage of the auxiliary power supply and comparing the sensed voltage with a pre-set voltage threshold, wherein the power condition exceeds a set power threshold if the sensed voltage exceeds the voltage threshold and the power condition is below the power threshold if the sensed voltage is below the voltage threshold.

The lighting device may comprise a housing designed for indoor and/or outdoor use. Due to the automatic synchronizing or calibration of the time circuit in accordance with the present disclosure, the lighting device requires no additional or special maintenance compared to a basic lighting device, such that the lighting device according to the present disclosure is particularly suitable for outdoor applications, such as street-lighting and safety lighting, for example.

The control circuit may take the form of a suitably programmed processor or programmable controller, such as a microprocessor or microcontroller, a Field-Programmable Gate Array, FPGA, or an Application Specific Integrated Circuit, ASIC, for example, provided with the lighting device. The voltage sensing and threshold comparison may be implemented in the control circuit, for example. The non-volatile memory may be provided as a separate memory circuit, such as an (Electrically) Erasable Programmable Read Only Memory, (E)EPROM, or integrated with the control circuit, for example.

For communication purposes, amongst others for storing a switching schedule in the memory, the lighting device may comprise a transceiver circuit for exchanging control signals with a server, in particular a wireless transceiver, such as a radio receiver operating with Radio Frequency, RF, or infra-red, IR, signalling, in accordance with a proprietary or standardized signalling protocol, such as Digital Addressable Lighting Interface, DALI, for example. In practice, wireless radio transmission technologies available for use with the invention are, inter alia, ZigBee™ Light Link, Bluetooth™, and Wi-Fi based protocols.

These and other aspects of the invention will be apparent from and elucidated with reference to the embodiment described hereinafter.

DETAILED DESCRIPTION

Figure 1:
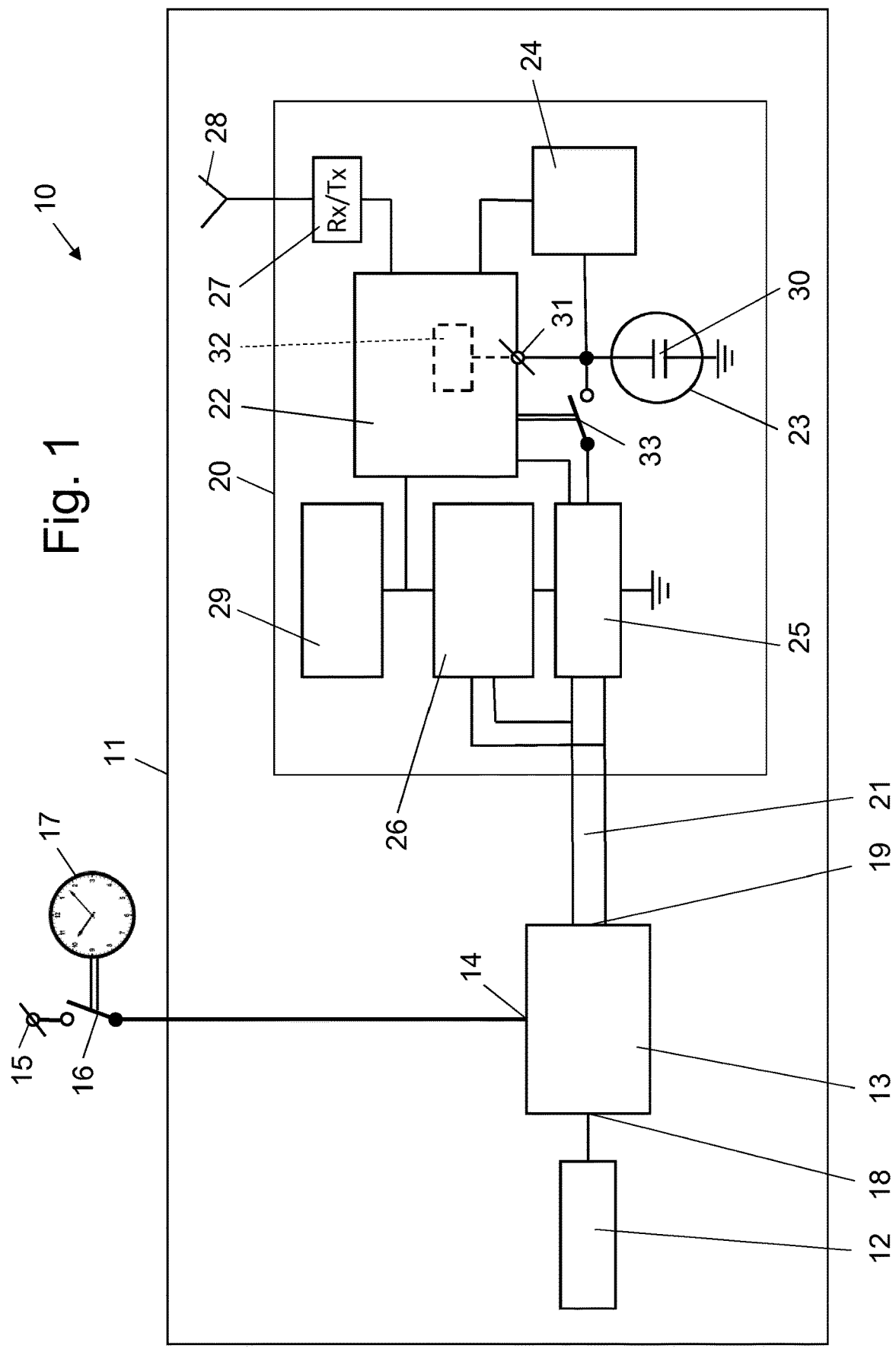
FIG. 1 shows an electrical circuit diagram of an example of a lighting device in accordance with an embodiment of the present disclosure.

Reference numeral 10 in FIG. 1 designates a lighting device in accordance with an embodiment of the invention, comprised of a housing 11, for example a moisture or watertight housing for outdoor use of the lighting device 10. It will be appreciated that the housing 11 may also be designed for indoor use or may have an armoured design for use as a safety lighting, for example.

The housing 11 accommodates a light emitting module 12, such as a light emitting module 12 comprised of a plurality of series and parallel connected light emitting diodes, LEDs, for example The light emitting module 12 is powered by a driver circuit 13 in the housing 11, a power input 14 of which electrically connects to a main power supply, such as separately switched main power supply or grid 15, providing electrical power to the lighting device 10 in specific power supply cycles, as schematically indicated by a switch 16.

The switch 16 may be time controlled from a central server, based on pre-set switching times and power supply cycle lengths and/or based on ambient lighting conditions, such as based on sunset and sunrise times, for example. The time controlled operation of the switch 16 is illustrated by a clock 17. A power output 18 of the driver circuit 13 electrically connects to the light emitting module 12. The driver circuit 13 further comprises a control signal and power interface 19 for exchanging control signals and electrical power over a data and power line bus 21 with a lighting control module 20 accommodated in the housing 11, such as, for example, a Digital Addressable Lighting Interface, DALI, control module.

In the embodiment shown, the driver circuit 13 operates, among others, to reduce and rectify an AC voltage of the main power supply 15, such as 230 V mains voltage, to a DC voltage suitable for powering of the light emitting module 12, and for switching the light emitting module 12 on and off, for driving the light emitting module to emit a reduced amount of light, i.e. dimming, to emit light of a particular colour, for example. Driver circuits of this type, are generally know in practice such that any detailed elaboration thereon is omitted here.

Instead of a solid state light emitting module 20, the lighting device 10 may comprise any known type of light emitting module or light source, such as low-voltage halogen type lighting, an incandescent lamp or fluorescent type lamp operating at mains voltage, for example. In a very basic embodiment of the lighting device 11, the driver circuit 13 may just be arranged for switching the light emitting module 12 on and off, for example, based on the respective control signals received over the bus line 21 at the interface 19.

The control module 20 comprises a control circuit 22, an auxiliary or back-up power supply 23, a timing circuit 24, such as an autonomously operating stable real time clock or counter circuit, a module power supply circuit 25, a signalling circuit 26, a wireless transceiver, Rx/Tx, 27 having an antenna 28 for communication purposes, and a non-volatile memory 29. The module power supply circuit 25 is arranged for converting electrical power received over the bus 21, for powering the various electrical components and circuits of the module 20. For storing power-off time values, the module power supply circuit 25 is arranged for keeping the circuitry of the control module 20 alive until the storage and some calculations, such as cycle time length calculations, are completed. However, the power required may alternatively be withdrawn from the auxiliary power supply 23, for example.

The control circuit 22 controls the operation of the light emitting module 12 by exchanging control signals with the driver circuit 13 over the signalling circuit 26 and the bus 21. The signalling circuit 26 operates, among others, for providing the control signals in the correct format in accordance with a particular signalling protocol, such as the $I^2C$ protocol, for example.

The timing circuit 24 operates on a stable time base, for example derived from a crystal type oscillator. The timing circuit 24 may comprise a counter circuit, the count value of which is representative or linked with the absolute clock time, or a Real Time Clock, RTC, circuit indicating the absolute clock time, i.e. the time of the day, in hours, minutes and seconds, for example. The RTC may also provide date information, that is the current day, month and year.

The memory 29 connects to the control circuit 22 and is arranged for reading data stored in and for writing data to be stored in the memory 29. The memory is of a non-volatile type, such as an (Electrically) Erasable Programmable Read Only Memory, (E)EPROM, flash memory, or the like. It will be appreciated that the memory 29 may be integral with the control circuit 22, such as on-board memory of processor or the like.

The control circuit 22 comprises a power sensing input 31 for monitoring a power condition of the auxiliary power supply 23, such as a voltage sensing input 31 of a voltage sensing circuit 32 of the control circuit 22. It will be appreciated that the voltage sensing circuit 32, or any other power condition determining circuit, may operate externally from the control circuit 22. The auxiliary power supply 23 electrically connects to the sensing input 31.

In the circuit diagram shown, the auxiliary power supply 23, such as a (re)chargeable battery or a super-capacitor 30, is charged from the module power supply circuit 25, during a power supply cycle, i.e. when the switch 16 is in a conducting state, supplying power to the lighting device 10. The charge storage capacity of the super-capacitor 30 is selected such that the timing circuit 24 can operate for at least the longest time-period between subsequent power supply cycles at subsequent days, and in particular for a longer period, say 24 hours or up to a few days for having a security margin, also taking account for capacity reduction of the super-capacitor due to ageing, for example. Which is suitable in practice for low-power chip timing circuits, for example.

For monitoring the power condition of the auxiliary power supply 23 at the sensing input 31, same has to be decoupled from the module power supply circuit 25. To this end, switch 33 is operated by the control circuit 22, for temporarily disconnecting the module power supply circuit 25 from the sensing input 31 and auxiliary power supply 23. Although switch 33 is shown as a mechanical type switch, it will be appreciated that this can be any type of switching device, including an electronically switch, for connecting and disconnecting the auxiliary power supply 23 to the module power supply circuit 25.

The transceiver circuit 28 may comprise any of an Infra-ReD, IR, or Radio Frequency, RF, transmitter and receiver. In practice, wireless radio transmission technologies available are, inter alia, ZigBee™ Light Link, Bluetooth™, and Wi-Fi based protocols. Via the transceiver circuit 28 data to be stored or stored in the memory 29 can be externally exchanged, such as a timing schedule or schedules for time-controlled operation of the lighting module 12 by the control circuit 22 and intermediate circuitry 26 and 29, with a central server (not shown), for example. Those skilled in the art will appreciate that data exchange with the control circuit 22 may also be effected through a wired transceiver module and the power supply 15, for example.

Figure 2:
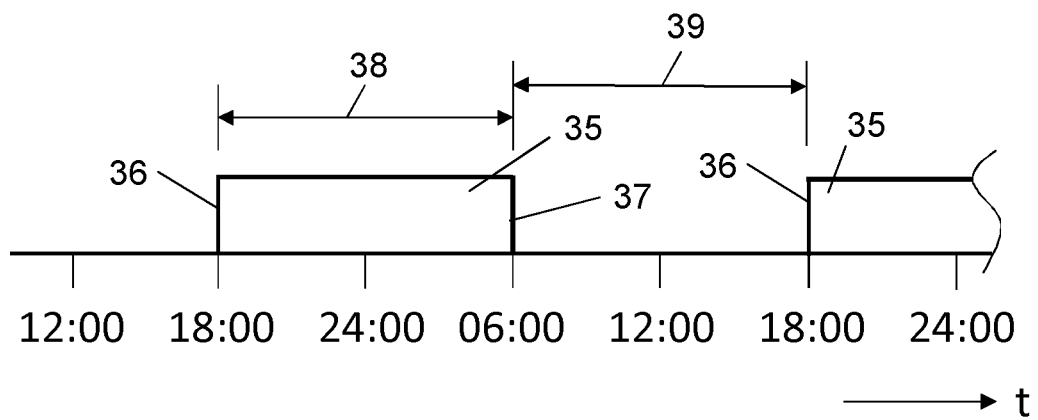
FIG. 2 shows an example of a periodic power supply cycle in accordance with the present disclosure.

FIG. 2 illustrates an example of a typical periodical power supply cycle 35 by which the switch 16 may be operated. At the horizontal axis the time t is depicted in hours. In this example, at 18:00 h switch 6 is switched on, i.e. set in its power conducting state, i.e. power-on time 36, such that power from the main power supply 15 is available at the lighting device 10. At 06:00 h switch 6 is switched off, i.e. the power supply to the lighting device 10 is interrupted, i.e. power-off time 37. In this embodiment, the power supply cycle time-length 38 amounts 12 hours.

The power supply cycle 35 represents a typical daily operation cycle of a street lighting. The power-on time 36 and power-off time 37 may be fixed or determined by the ambient light condition, for example based on sunset and sunrise times, or measured by a central ambient light monitoring device, for example.

During the power supply cycle 35 the control circuit 22 of the lighting device 10, based on the timing circuit 24 thereof, may operate the light emitting module 12 for adapting the amount of light emitted thereof. For example, in the case of a street lighting, from 24:00-04:00 h the light emitting module 12 may be dimmed as there is less traffic on the street, or even completely switched off, while from 04:00-06:00 h traffic increases, necessitating an adequate lighting, such that the light emitting module 12 is operated at 100% light emission, for example. The 100% light emission may be replaced by a dimming of the emitted light as a function of sunlight and/or according to a dimming profile depending on the hour of the day, for example. Those skilled in the art will appreciate that other operational modes are feasible, inclusive light colour adaptation etc. The particular corresponding timing values may also be stored in the memory 29.

Figure 3:
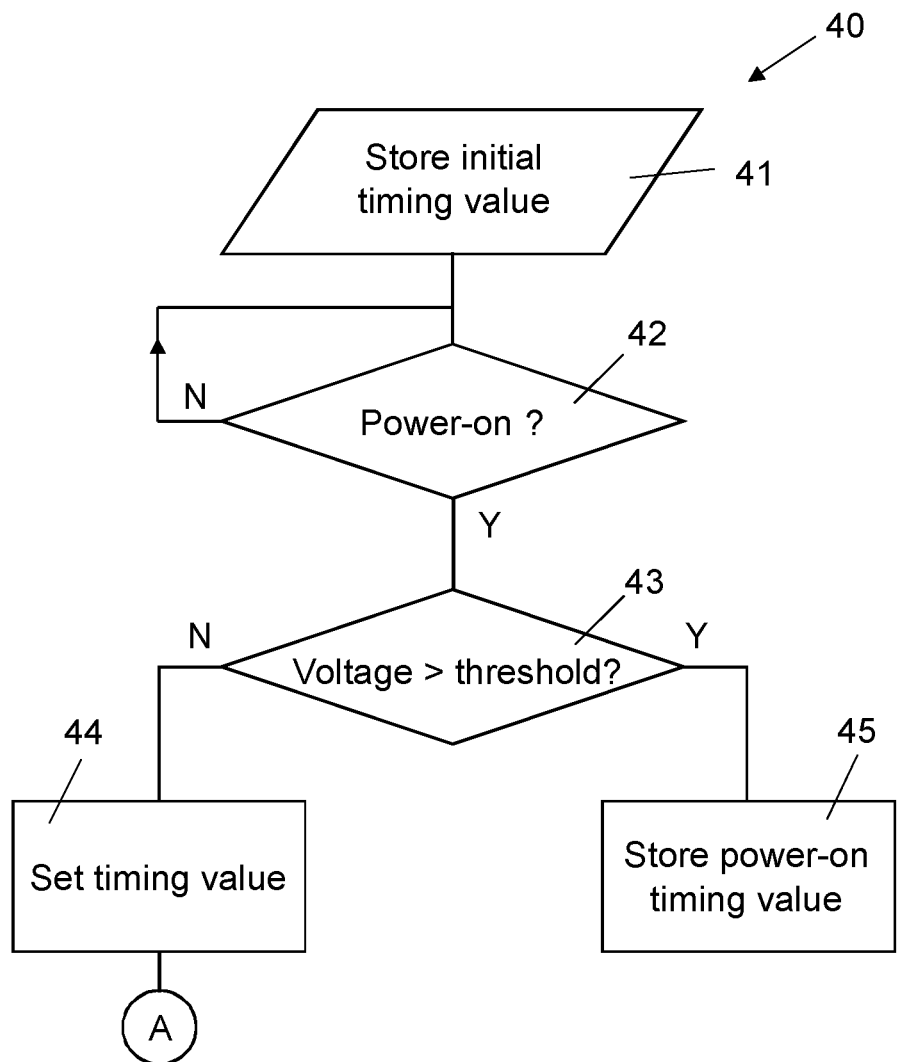
FIGS. 3 and 4 show a simplified flow chart diagram illustrating an example of the steps performed in a method according to an embodiment of the present disclosure.

Operation of the lighting device 10 in accordance with an embodiment of the method of the present disclosure will now be explained with reference to the simplified flow chart diagram 40 shown in FIG. 3. The direction of flow in the flow chart diagram 40 is assumed from the top to the bottom of the sheet. Other flow directions are indicated by a respective arrow. The operational steps of the method are implemented in and performed by a suitable software program or code, executed in the control circuit 22, comprising any of a microprocessor or microcontroller, a Field-Programmable Gate Array, FPGA, or an Application Specific Integrated Circuit, ASIC, for example.

The operation is assumed to start with storing, in the memory 29, an initial timing value that matches the power-on time of a power supply cycle, such as for example the power-on time 36 of the power supply cycle 35. Block 41, "Store initial timing value". This initial timing value may be communicated from a central server through the communication link 27, 28, for example. However, the initial timing value may also pre-stored at the factory, for example. In the case of an RTC circuit, for example, the initial timing value may comprise time and date information.

Decision block 42, "Power-on?", represents the start, i.e. result yes, "Y", of a power supply cycle. The result no, "N", represents an operational mode wherein no power from the main power supply 15 is supplied to the lighting device 10. At power-on, i.e. result "Y" of decision block 42, the power condition of the auxiliary power supply 23 is established at the voltage sensing input 31 of the control circuit 22, through the voltage sensing circuit 32, i.e. decision block 43, "Voltage>threshold?". To this end, the control circuit 22 controls the switch 33 to disconnect the auxiliary power supply 23 from the module power supply circuit 25. It is noted that the disconnected state of switch 33 may be the default position at powering up of the control circuit.

At the first start-up of the lighting device, the super-capacitor 30 of the auxiliary power supply 23 will not be charged, such that the power condition of the auxiliary power supply 23 is insufficient, i.e. result no, "N", of decision block 43. In that case it can be validly assumed that the actual timing value of the timing circuit 24 will not be equal, i.e. synchronized with the power-on time 36. By setting the timing value of the timing circuit 24 equal to the time stored in the memory 29, the timing circuit 24 is effectively synchronized to the actual or absolute time at power-on of the power supply cycle 35, i.e. block 44, "Set timing value".

The switch 33 will now be closed, i.e. put in its current conducting state, by the control circuit 22, such that the auxiliary power supply 23, i.e. the super-capacitor 30, will be charged by the module power supply circuit 25.

At power-on of the next power supply cycle 35, assuming that no irregularities have occurred by which the auxiliary power supply 23 has been discharged, for example, the result of the power monitoring in decision block 43 will be positive, i.e. yes, "Y", i.e. the auxiliary power supply has sufficient power available, such that it may be assumed that the timing circuit 24 has been in proper operation during the time that no power is supplied to the lighting device 10. The actual timing value of the timing circuit 24 is now stored in the memory 29, and may replace the stored initial value, i.e. block 45, "Store power-on timing value".

However, if the lighting device 10 has been out of operation for a longer period, for example due to a power outage of the main power supply 15, such that the power available at the auxiliary power supply 23 has dropped below a level not facilitating proper operation of the timing circuit 24, or even that the timing circuit 24 has ceased operation, with the availability of the mains power supply at the next power-on time 36 of a power supply cycle 35, the timing circuit 24 is set to operate with the timing value last stored in the memory 29.

It will be appreciated that when the power supply cycle 35, for example, starts each day at the same time, for example at 18:00 h in the evening, by the above method, the timing circuit is automatically synchronized to the correct time of a day. However, also when the power supply cycle does not start each day at the same time but, let say, is started at sunset, the timing circuit will be approximately synchronized at the correct time of the day, provided that the period since the last storage of the timing value is not too large. That is, over a couple of days, the time of sunset will not change too drastic.

Accordingly, the timing circuit 24 is automatically synchronized or calibrated to the absolute or real time associated with the power-on time 36 of a power supply cycle 35.

Figure 4:
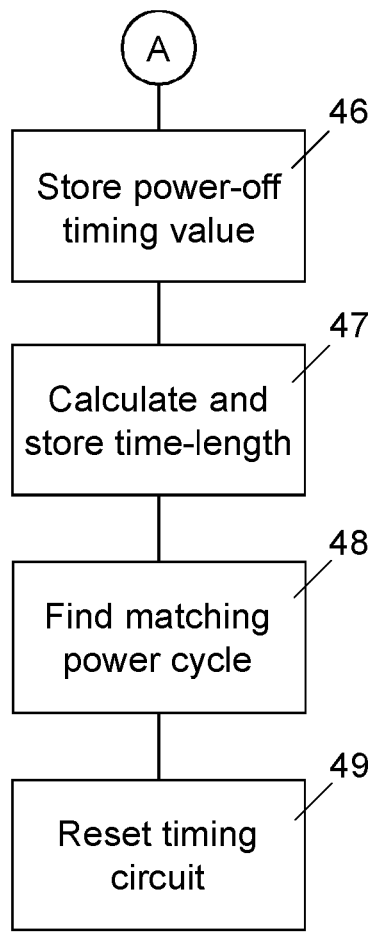

In a further embodiment the control circuit 22 is arranged for storing, in the memory 29, a momentary timing value of the timing circuit 24 at the power-off time 37 of the power supply cycle 35. From the timing values stored at the power-on time 36 and the power-off time 37 of the power supply 35, the time-length 38 of this power supply cycle 35 can be calculated by the control device 22 and stored in the memory 29, as illustrated in the flow chart diagram of FIG. 3, i.e. block 46, "Store power-off timing value", and block 46, "Calculate and store time-length", respectively. The encircled symbol "A" in FIGS. 3 and 4 denote that the steps of FIG. 4 may follow step 44 shown in FIG. 3.

If, for example, a calculated current time-length significantly deviates from a stored time-length or a set or default time-length value stored in the memory, for example more than an hour, it may be concluded that there is a malfunctioning in the control equipment 16, 17 controlling the main power supply cycle from the power supply 15, or even that the main power supply 15 is not available, such that stored timing values may be discarded, for example. In that case, previously stored timing values may not be directly replaced when storing a power-on timing value in the memory 29. Instead, previously stored power-on timing values may be kept and used for the operation of the lighting device 10 till a current time-length is calculated that fits a stored time-length.

In practice, the lighting device 10 may be powered by different power supply cycles, depending on the day of the week, for example. This means that the lighting device 10 is periodically powered in accordance with a plurality of sequential power supply cycles. By selecting the power supply such that each power supply cycle has a unique time-length, or that the power supply cycle during weekends, for example on Sunday, differs in time-length from the other days of the week, and by storing such power supply time-lengths and the corresponding power-on timing value and/or the corresponding power-off timing value in the memory 29, the timing circuit 24 may be also synchronized to the particular day of the week or to weekdays or Sunday, for example. One of the power-on time or the power-off time may be the same for all power supply cycles, for example.

To this end, the calculated time-length, i.e. block 47, is compared by the control circuit 22 to match same with a stored time-length, i.e. block 48, "Find matching power cycle". From the matching time-length the particular day of the week can be determined, such that the timing circuit 24 can be reset, i.e. synchronized, by the control circuit 22, to a particular day, i.e. block 49, "Reset timing circuit". The timing value of the timing circuit 24 may also be reset to a particular power-off timing value of the matching power supply cycle stored in the memory 29 or reset to the power-on timing value available in the memory 29 of a next power supply cycle following the matching power supply cycle at the power-on time of the next power supply cycle, i.e. at the next day, for example.

Table 1 below shows an example of a time schedule to be stored in the memory 29, in which to each day of the week a power supply cycle having a different time-length is allocated. In the table, a particular time is indicated in the form of hours:minutes (hh:mm). The power-on time is for each day 5 minutes later, while the power-off time is the same for each day. Accordingly, from Monday to Sunday the power supply cycle length decreases by 5 minutes.

TABLE 1

| Day | Power-off time (hh:mm) | Power-on time (hh:mm) | Power supply cycle time-length (hh:mm) |
|---|---|---|---|
| Monday | 08:00 | 16:00 | 16:00 |
| Tuesday | 08:00 | 16:05 | 15:55 |
| Wednesday | 08:00 | 16:10 | 15:50 |
| Thursday | 08:00 | 16:15 | 15:45 |
| Friday | 08:00 | 16:20 | 15:40 |
| Saturday | 08:00 | 16:25 | 15:35 |
| Sunday | 08:00 | 16:30 | 15:30 |

It will be appreciated that in some applications, two or more power supply cycles in a same day or period may be provided. In that case, by providing each power supply cycle a unique time-length, the timing circuit 24 can be still synchronized to the correct day and time of a day, for example.

In an even further embodiment, by ensuring that each power supply cycle time-length corresponds to a different day of a year, the timing circuit 24, in the above described manner, can be reset, i.e. synchronized or calibrated, to a corresponding day of the year based on the matching power supply cycle or the next power supply cycle, i.e. the next day. In this manner, power supply cycles that differ for public holidays and during daylight savings periods may be taken into account when synchronising or calibrating the timing circuit.

Table 2 below shows an example of an operating or time schedule of the lighting device 10 wherein the time-length of a particular power supply cycle is coded to a particular day of a year, by differing in the minutes part of a power supply time-length, and to a particular week by differing in the hours part and the minutes part of the power supply cycle time-length, for example.

In the table, a particular day in each week has a same power supply cycle time-length and each Sunday of a particular week has a power supply time length that differs from week to week. Week number nn (such as nn=01, 02, . . . , 52) has a time-length equal to 17 hours and nn minutes. From these different time-lengths, the day of the week and a particular a easily recognizable such that the timing circuit can be synchronized to the correct time of the day, the day of the week and the particular week.

TABLE 2

| Day | Power-off time (hh:mm) | Power-on time (hh:mm) | Power supply cycle time-length (hh:mm) |
|---|---|---|---|
| Monday | 08:00 | 16:00 | 16:00 |
| Tuesday | 08:00 | 16:05 | 15:55 |
| Wednesday | 08:00 | 16:10 | 15:50 |
| Thursday | 08:00 | 16:15 | 15:45 |
| Friday | 08:00 | 16:20 | 15:40 |
| Saturday | 08:00 | 16:25 | 15:35 |
| Sunday (Week 01) | 09:01 | 16:00 | 17:01 |
| | | | | |
| Sunday (Week nn) | 09:nn | 16:00 | 17:nn |
| | | | | |
| Sunday (Week 52) | 09:52 | 16:00 | 17:52 |

While the disclosure has been illustrated and described in detail in the drawings and foregoing description, such illustration and description are to be considered illustrative or exemplary and not restrictive; the disclosure is not limited to the disclosed embodiments.

For example, it is possible to operate the invention in an embodiment wherein the power supply cycles not differ in the power supply time-length 38 as shown in Tables 1 and 2, for example, but differ in the time-length in which no power is supplied to the lighting device, i.e. the OFF-power cycle time length 39 as illustrated in FIG. 2. Accordingly, for the purpose of the present description and the appended claims, the term power supply cycle time-length may be construed as comprising one of the power supply time-length 38 or the OFF-power cycle time length 39.

In case of power failure detection, a default scheduler may be used till the full (re)synchronization of the timing circuit. In such case a conservative lighting scheme may be considered.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A method of synchronizing a timing circuit, in particular a real time clock circuit, in a lighting device that is periodically powered from a main power supply in accordance with a power supply cycle having a power-on time and a power-off time, said lighting device comprising a light emitting module and a control circuit for switching said light emitting module based on said timing circuit and comprising a non-volatile memory, said timing circuit being additionally powered from an auxiliary power supply charged by said main power supply, said method comprising the steps of:
determining, by said control circuit, at each power-on of said power supply cycle, a power condition of said auxiliary power supply,
storing, by said control circuit, in said memory, a momentary timing value of said timing circuit if said determined power condition exceeds a set power threshold, and
setting, by said control circuit, said timing circuit at said stored timing value if said determined power condition is below said set power threshold.

2. The method according to claim 1, further comprising the step of:
storing, by said control circuit, in said memory, a momentary timing value of said timing circuit at power-off of said power supply cycle, and
calculating, by said control circuit, a power supply cycle time-length from said timing value stored in said memory at power-on and said timing value stored at power-off of a corresponding power supply cycle.

3. The method according to claim 2, wherein said lighting device is periodically powered in accordance with a plurality of sequential power supply cycles, each power supply cycle having a different time-length and at least one of a power-on timing value and a power-off timing value stored in said memory, said method further comprising the steps of:
determining, by said control circuit, from said calculated power supply cycle time-length and said stored power supply cycle time-lengths, a power supply cycle matching said calculated power supply cycle time-length, and
resetting, by said control circuit, said timing circuit at either one of said power-off timing value of said matching power supply cycle and said power-on timing value of a next power supply cycle following said matching power supply cycle at power-on of said next power supply cycle.

4. The method according to claim 3, wherein each power supply cycle time-length corresponds to a different day of a week, wherein said step of resetting said timing circuit comprises resetting said timing circuit to a corresponding day of the week based on a respective one of said matching power supply cycle and said next power supply cycle.

5. The method according to claim 4, wherein each power supply cycle time-length corresponds to a different day of a year, wherein said step of resetting said timing circuit comprises resetting said timing circuit to a corresponding day of the year based on a respective one of said matching power supply cycle and said next power supply cycle.

6. The method according to claim 5, wherein said power supply time-length comprises a minutes part and a seconds part, wherein a length of one of said parts indicates a particular month and a length of another of said parts indicates a particular day of said month.

7. The method according to claim 1, wherein said power condition of said auxiliary power supply is determined by sensing a voltage of said auxiliary power supply and comparing said sensed voltage with a pre-set voltage threshold, wherein said power condition exceeds a set power threshold if said sensed voltage exceeds said voltage threshold and said power condition is below said power threshold if said sensed voltage is below said voltage threshold.

8. A lighting device, for being periodically powered from a main power supply in accordance with a power supply cycle having a power-on time and a power-off time, said lighting device comprising a light emitting module, a timing circuit, in particular a real time clock circuit, a control circuit for switching said light emitting module based on said timing circuit, a non-volatile memory operatively connected to said control circuit, and an auxiliary power supply, operatively connected for being charged from said main power supply and for powering said timing circuit, said control circuit configured to:
determine, at each power-on of said power supply cycle, a power condition of said auxiliary power supply,
store, in said memory, a momentary timing value of said timing circuit if said determined power condition exceeds a set power threshold, and
settle said timing circuit at said stored timing value if said determined power condition is below said set power threshold.

9. The lighting device according to claim 8, wherein said control circuit is configured to store, in said memory, a momentary timing value of said timing circuit at power-off of said power supply cycle, and to calculate a power supply cycle time-length from said timing value stored in said memory at power-on and said timing value stored at power-off of a corresponding power supply cycle.

10. The lighting device according to claim 9, wherein said memory comprises a plurality of sequential power supply cycles, each power supply cycle having a different time-length and at least on of a power-on timing value and a power-off timing value, wherein said control circuit is configured to:

determine, from said calculated power supply cycle time-length and said stored power supply cycle time-lengths, a power supply cycle matching said calculated power supply cycle time-length, and reset said timing circuit at either one of said power-off timing value of said matching power supply cycle and said power-on timing value of a next power supply cycle following said matching power supply cycle at power-on of said next power supply cycle.

11. The lighting device according to claim 10, wherein each power supply cycle time-length corresponds to a different day of a week, and said control circuit is configured to reset said timing circuit to a corresponding day of the week based on a respective one of said matching power supply cycle and said next power supply cycle.

12. The lighting device according to claim 11, wherein each power supply cycle time-length corresponds to a different day of a year, and said control circuit is configured to reset said timing circuit to a corresponding day of the year based on a respective one of said matching power supply cycle and said next power supply cycle.

13. The lighting device according to claim 8, wherein said timing circuit is an autonomous Real Time Clock, RTC, integrated circuit and said auxiliary power supply is a super-capacitor.

14. The lighting device according to claim 8, wherein said control circuit comprises a voltage sensing circuit for sensing a voltage of said auxiliary power supply and comparing said sensed voltage with a pre-set voltage threshold, wherein said power condition exceeds a set power threshold if said sensed voltage exceeds said voltage threshold and said power condition is below said power threshold if said sensed voltage is below said voltage threshold.

15. The lighting device according to claim 8, comprising a housing arranged for outdoor lighting of said lighting device.

\* \* \* \* \*